March 25, 1952  J. P. MINTON  2,590,822
FILTER FOR SEISMIC PROSPECTING
Filed June 28, 1946
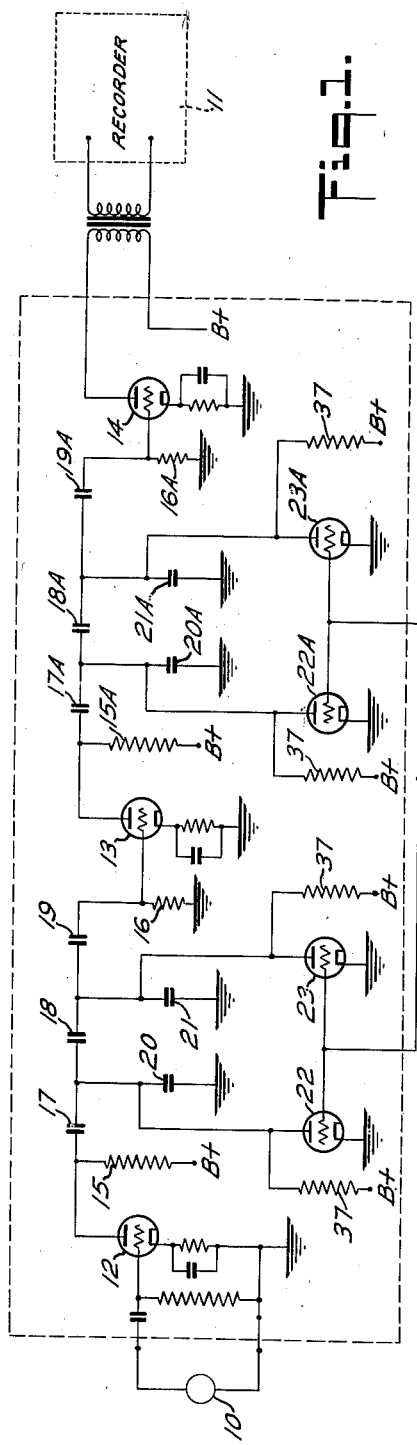
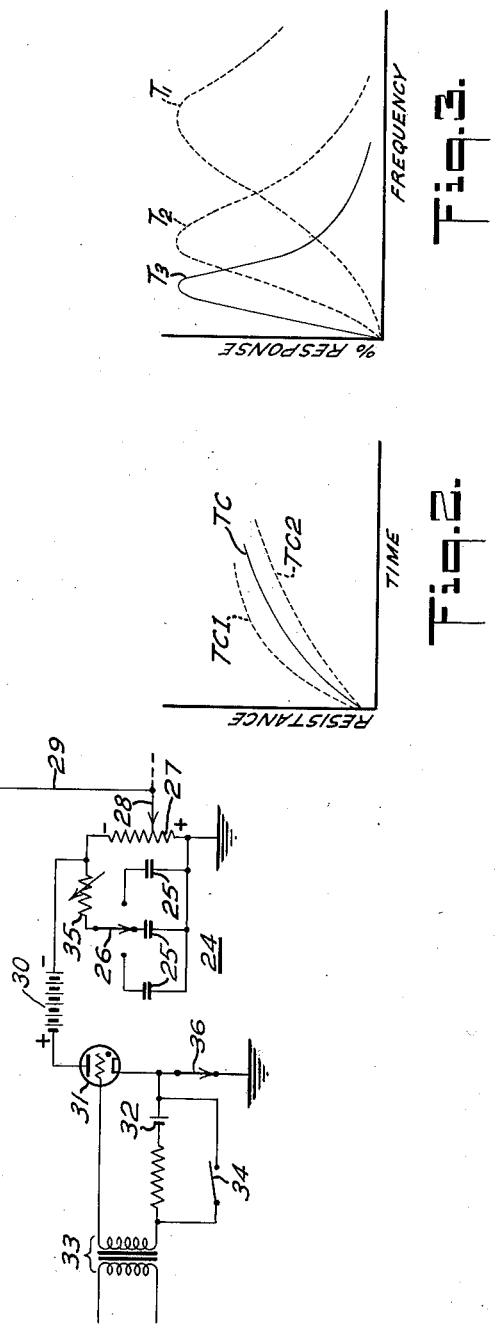
INVENTOR.
JOHN P. MINTON
BY
ATTORNEY Patented Mar. 25, 1952

2,590,822

UNITED STATES PATENT OFFICE 2,590,822

FILTER FOR SEISMIC PROSPECTING

John P. Minton, Dallas, Tex., assignor, by mesne assignments, to Socony-Vacuum Oil Company, Incorporated, New York, N. Y., a corporation of New York Application June 28, 1946, Serial No. 679,991

5 Claims. (Cl. 178—44)

This invention relates to seismic propecting and particularly concerns control of the frequency-response characteristics of systems utilized to amplify, for recording purposes, the seismic signals produced by the geophones.

To facilitate interpretation of the records made by the seismic waves produced by detonation of a charge of explosive, the frequency-response characteristic of the detecting and recording system should be varied in the interval following the explosion continuously to favor the predominant frequency of the recorded waves which changes during that interval.

In accordance with the present invention, the frequency selection is effected by a filter network including one or more electronic tubes whose anode-cathode resistances are used as filter impedances which are varied, each as a function of time automatically to shift the frequency-response characteristic of the filter so that the favored frequencies become lower and lower during the wave-recording period. More specifically, the biasing potential applied to control electrodes of the tubes for variation of aforesaid frequency-determining resistances of the filter is derived, independently of the signal to be recorded, from an electrical network whose time constant determines the rate at which the biasing potential changes after explosion of the charge or after arrival of the first waves at a selected geophone, for example, the "uphole" geophone.

For further explanation of the invention, reference is made to the accompanying drawings, in which:

Fig. 1 schematically illustrates a geophone channel utilizing the invention; and Figs. 2 and 3 are explanatory figures referred to in discussion of the operation of Fig. 1.

Referring to Fig. 1, between the geophone 10, or equivalent device for producing a signal output in response to seismic waves, and the recorder 11 which traces a record of such waves there is interposed a signal amplifier having suitable number of stages and including in the specific arrangement shown the amplifier tubes 12, 13 and 14. In the signal channel between the geophone and the associated recorder equipment there is also included one or more frequency-selective networks. In the particular arrangement shown, between the amplifier tubes 12 and 13 there is included a resistance capacitance (R. C.) filter network comprising the resistors 15 and 16, respectively disposed in the plate circuit of tube 12 and the grid circuit of tube 13, the series capacitors 17, 18 and 19, and the shunt capacitors 20 and 21. In shunt with condenser 20, there is connected the internal anode-cathode resistance of tube 22 and, similarly, the condenser 21 is shunted by the anode-cathode resistance of tube 23. The control grids of tubes 22 and 23 receive their biasing potential from a network 24, comprising in the particular arrangement shown, a plurality of capacitors 25 of different values which may be selectively included in the network 24 by actuation of switch 26 to one or another of its various positions. The control grids of tubes 22 and 23 are connected by lead 29 to contact 28, adjustable along the voltage divider resistor 27 connected in shunt to the condenser 25 in circuit so that any percentage of the total voltage existing across the condenser may be utilized to bias the tubes 22 and 23.

A battery, or equivalent source of charging current for the condenser 25, is connected to the network 24 through a switch, preferably an electronic switch or thyratron 31, whose control grid is biased as by battery 32 so that no anode current flows through the tube until a starting signal is impressed on the grid circuit as by transformer 33, whose primary circuit is connected either to a device which momentarily produces a starting signal upon detonation of an explosive charge or to a selected geophone which produces the starting signal upon reception of the first seismic waves resulting from the explosion of the charge. The switch 34 is a test switch which may be manually closed, in simulation of a starting signal, to check the performance of the signal channel. The switch 36 is provided to interrupt flow of the tube current after a recording run.

When the tube 31 fires in response to the starting signal, the charging circuit of the selected condenser is completed and the voltage across the resistor 27 rises at a rate determined by the time constant of the network 24. The rate may be manually predetermined by selection or adjustment of the capacitor 25 in circuit as by actuation by switch 26, or additionally or alternatively by adjustment of resistance 35. By selection or adjustment of the time constant of network 24, the voltage across resistor 27 approaches its ultimate value at the desired selected rate and within a predetermined time interval. Normally, the selected time constant of the network is such that the voltage across condenser 25 does not reach its equilibrium value until near termination of the recording period which generally is not longer than about five seconds or so; that is, the time constant of network 24 may be about two seconds or longer.

The effect of changing the biasing voltage applied to the control grids of tubes 22 and 23 is to change the magnitudes of resistances in shunt to the condensers 20 and 21, thereby to vary the frequency-response characteristic of the filter network between the tubes 12 and 13. Before the tube 31 is fired, the biasing potential applied to the grids of tubes 22 and 23, insofar as network 24 is concerned, is zero; a different minimum bias, however, may be used, if desirable or necessary, by inclusion of a biasing battery or equivalent, in the common grid circuit of the tubes, or if different biases are desirable, by separate battery, or equivalent, connected for example, in the cathode to ground connections of the tubes 22 and 23. For purposes of explanation, however, it is assumed that the only grid bias applied to tubes 22 and 23 is that derived from network 24. At the beginning of the wave-recording interval, therefore, the anode-cathode resistances of tubes 22 and 23 are of minimum value and consequently have maximum shunting effect upon the condensers 20 and 21 respectively. The constants of the filter network are so selected that under this circumstance it favors the transmission of the higher frequencies of interest, that is, frequencies of the order of seventy cycles or eighty cycles. The frequency-response characteristic of the filter is at this time generally similar to that exemplified by curve T1 of Fig. 3.

With passage of time after a starting signal, the biasing potential derived from network 24 and applied to the control grids of the tubes 22 and 23 becomes more and more negative with resultant increase in magnitude of the internal anode-cathode resistance of each of tubes 22 and 23. The increasing magnitude of these resistances causes a progressively decreasing shunting effect upon the capacitors 20 and 21 with the result that the frequency favored for transmission through the filter becomes progressively lower and lower, the frequency-response characteristic having at an intermediate time generally the shape exemplified by curve T2 of Fig. 3, corresponding with that of a filter which passes a band of frequencies in the range of forty cycles to sixty cycles and more or less sharply discriminates against higher or lower frequencies outside of that band. As the end of the recording interval is approached, the internal resistances of tubes 22 and 23 approaches a maximum, which is predetermined by the setting of the potentiometer contact 28, at which they provide a minimum shunting effect upon the condensers 20 and 21. Consequently, at that time the filter network strongly favors low frequencies, for example, those of the order of twenty cycles or so, thus to condition the geophone channel for response to reflections from deep strata.

The manner in which the frequency-response characteristic is shifted during the interval between the starting signal and the end of the recording interval may be varied, as above described, so to attain the desired emphasis upon different frequencies at different times in the interval following a shot. The manner in which the resistance of the tubes 22 and 23 varies with time for three different time constants of network 24 is shown in Fig. 2: for low product of the capacity and resistance (27 plus 35) of network 24, the resistance increases rather rapidly as exemplified by curve TC1: for higher and higher time constants, the resistance rises more and more slowly as exemplified by curves TC and TC2. In a recording interval following a shot, the shift of the frequency-response characteristic varies in predetermined manner with time in accordance with the preselected constants of network 24: the shift does not depend upon the amplitude or frequency of the seismic signals being recorded.

The frequency-response control described may be applied to as many filter sections as desirable. As indicated in Fig. 1, the coupling system between the tubes 13 and 14 may also comprise a filter network similar to that between the tubes 12 and 13; the corresponding elements have been identified by the same reference characters with addition of the suffix $a$. The control grids of all tubes are connected together in parallel for derivation of their biasing voltage from the single control network 24 which may also be used to supply the biasing voltage for similar filter networks included in the signal channels of other geophones of a spread. It is, however, within the scope of the invention to derive individual biasing voltages for the tubes of various filter sections of a single channel from other resistance-condenser networks controlled by the same electronic switch or different electronic switches, thus to obtain greater flexibility in control of the overall frequency-response characteristics of the channel.

It is within the scope of the invention to utilize a filter network employing the resistance of electronic tubes as frequency-determining impedances which are varied as a function of time, whether those filter sections be in advance of, beyond, or between amplifier tubes in the geophone channel.

By way of example of suitable filter constants, the condensers 17 and 19 may each have a capacity of about one microfarad; the condensers 18 and 20 and 21 may each have a magnitude of about 0.25 microfarad, and the tubes 22 and 23 may be of any type whose resistance may be varied from about 10,000 ohms to 100,000 ohms by change of the biasing voltage applied to a control electrode, for example, the control grid. It shall be understood the tubes 22 and 23 need not be triodes as shown for simplicity of explanation but may be tubes having greater number of electrodes in which event, the interelectrode resistance used for frequency-selection purposes may be other than the anode-cathode resistance and the controlled bias may be applied to a control electrode other than the grid electrode nearest the cathode.

The resistors 37 connected between the anodes of the tubes 22 and 23 and the source of anode current are each effectively in shunt to the tube resistance varied for frequency-selection purposes and should, therefore, for wide range of control be large compared to the maximum tube resistance used: in the particular example above in which the maximum tube resistance is of the order of 100,000 ohms, the associated resistors 37 should be of the order of about a megohm or higher. This same relation should be observed whatever interelectrode resistance is chosen as the frequency-determining resistance of a filter section; that is, any resistance associated with it for purpose of supplying the operating voltage of one of the electrodes involved should be high compared to the internal resistance between that electrode and the cathode or equivalent.

What is claimed is:

1. In apparatus for recording seismic waves, a resistance-capacitance filter whose frequency-response characteristic varies as a predetermined function of time during the wave-recording period following a starting signal, comprising a series capacitor connected between an input terminal and an output terminal of said filter, shunt circuits each including a capacitor respectively on the input and output sides of said series capacitor, electronic tubes having interelectrode resistances respectively in shunt to said shunt circuit capacitors and having control electrodes whose biasing potential determines the magnitudes of said resistances, and means effective in response to said starting signal to vary said biasing potential in correspondence with said predetermined function of time.

2. In apparatus for recording seismic waves, a resistance-capacitance filter whose frequency-response characteristic varies as a predetermined function of time during the wave-recording period following a starting signal, comprising capacitors in series between an input terminal and an output terminal of said filter, shunt circuits intermediate each of said series capacitors and each including a capacitor, electronic tubes having interelectrode resistances in shunt to each of said shunt circuit capacitors and having control electrodes whose biasing potential determines the magnitudes of said resistances, and means effective in response to said starting signal to vary said biasing potential in correspondence with said predetermined function of time.

3. In an apparatus for recording seismic waves, a resistance-capacitance filter whose frequency-response characteristic varies as a predetermined function of time during the wave-recording period following a starting signal, comprising a series capacitor connected between an input terminal and an output terminal of said filter, a shunt circuit including a capacitor connected to one of the terminals of said series capacitor, an electronic tube having an interelectrode resistance connected in shunt to said shunt circuit capacitor and having a control electrode whose biasing potential determines the magnitude of said interelectrode resistance, and means effective in response to said starting signal to vary said biasing potential in correspondence with said predetermined function of time.

4. In an apparatus for recording seismic waves, a resistance-capacitance filter whose frequency-response characteristic varies as a predetermined function of time during the wave-recording period following a starting signal comprising series capacitors connected between an input terminal and an output terminal of said filter, a shunt circuit including a capacitor connected between said series capacitors, an electronic tube having an interelectrode resistance connected in shunt to said shunt circuit capacitor and having a control grid whose biasing potential controls said interelectrode resistance, a network including a capacitor connected to said control grid, and means effective in response to said starting signal to vary the potential across said last-named capacitor to vary the bias on said control grid in correspondence with said predetermined function of time.

5. In an apparatus for recording seismic waves, a resistance-capacitance filter whose frequency-response characteristic varies as a predetermined function of time during the wave-recording period following a starting signal comprising capacitors in series between an input terminal and an output terminal of said filter, shunt circuits intermediate each of said series capacitors and each including a capacitor, electronic tubes having interelectrode resistances in shunt to each of said shunt circuit capacitors and having control grids whose biasing potential determines the magnitude of said interelectrode resistances, means for connecting said control grids in parallel, a network including a capacitor connected to said control grids, and means effective in response to said starting signal to vary the potential on said last-named capacitor to vary the biasing potential on said grids in correspondence with said predetermined function of time.

JOHN P. MINTON.

REFERENCES CITED

The following references are of record in the file of this patent:

UNITED STATES PATENTS

| Number | Name | Date |
|---|---|---|
| 2,045,300 | Koch | June 23, 1936 |
| 2,053,841 | Prescott | Sept. 8, 1936 |
| 2,112,595 | Farnham | Mar. 29, 1938 |
| 2,148,030 | McLennan | Feb. 21, 1939 |
| 2,217,806 | Muffly | Oct. 15, 1940 |
| 2,330,216 | Hoover | Sept. 28, 1943 |
| 2,379,707 | Hathaway | July 3, 1945 |